(12) United States Patent
Somani et al.

(10) Patent No.: US 8,533,257 B2
(45) Date of Patent: Sep. 10, 2013

(54) SYSTEM AND METHOD FOR INTERFACING WITH AN ENTERPRISE RESOURCE PLANNING SYSTEM

(75) Inventors: Hemant Somani, Hales Corners, WI (US); Jung-Hsiang Hu, Germantown, WI (US); Steven Louis Fischer, Mequon, WI (US); Jeffrey W. Feldman, West Allis, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 388 days.

(21) Appl. No.: 12/893,815

(22) Filed: Sep. 29, 2010

(65) Prior Publication Data

US 2012/0079003 A1    Mar. 29, 2012

(51) Int. Cl.
*G06F 15/16*    (2006.01)
(52) U.S. Cl.
USPC .......................................... 709/203; 709/219
(58) Field of Classification Search
None
See application file for complete search history.

(56) References Cited

U.S. PATENT DOCUMENTS

| | | | |
|---|---|---|---|
| 5,626,140 A | 5/1997 | Feldman et al. | |
| 6,825,860 B1 | 11/2004 | Hu et al. | |
| 6,938,079 B1 * | 8/2005 | Anderson et al. | 709/222 |
| 7,091,483 B2 | 8/2006 | Fischer et al. | |
| 7,180,059 B2 | 2/2007 | Fischer et al. | |
| 7,190,382 B1 | 3/2007 | Retlich et al. | |
| 2006/0155868 A1 * | 7/2006 | Vayssiere et al. | 709/232 |
| 2006/0277194 A1 * | 12/2006 | Britt et al. | 707/10 |
| 2009/0216863 A1 * | 8/2009 | Gebhart et al. | 709/220 |

* cited by examiner

*Primary Examiner* — John B. Walsh
(74) *Attorney, Agent, or Firm* — Fletcher Yoder, P.C.; Alexander R. Kuszewski; John M. Miller

(57) ABSTRACT

Present embodiments are directed to a system and method for facilitating communication between an external application stored on an external computer and an Enterprise Resource Planning (ERP) system component without utilizing a format of the ERP system. Present embodiments function to receive configurable material in a first data format from the external application into a user control stored on the external computer and convert the configurable material into a second data format with the user control. Additionally, present embodiments operate to make the configurable material available in the second data format to a server-side scripting component of an ERP system. Further, present embodiments function to receive a response object from the server-side scripting component in a third data format and convert the response object into configuration data in the first data format with the user control, and transmit the configuration data in the first data format to the external application with the user control.

21 Claims, 2 Drawing Sheets

SYSTEM AND METHOD FOR INTERFACING WITH AN ENTERPRISE RESOURCE PLANNING SYSTEM

BACKGROUND

Figure 1:
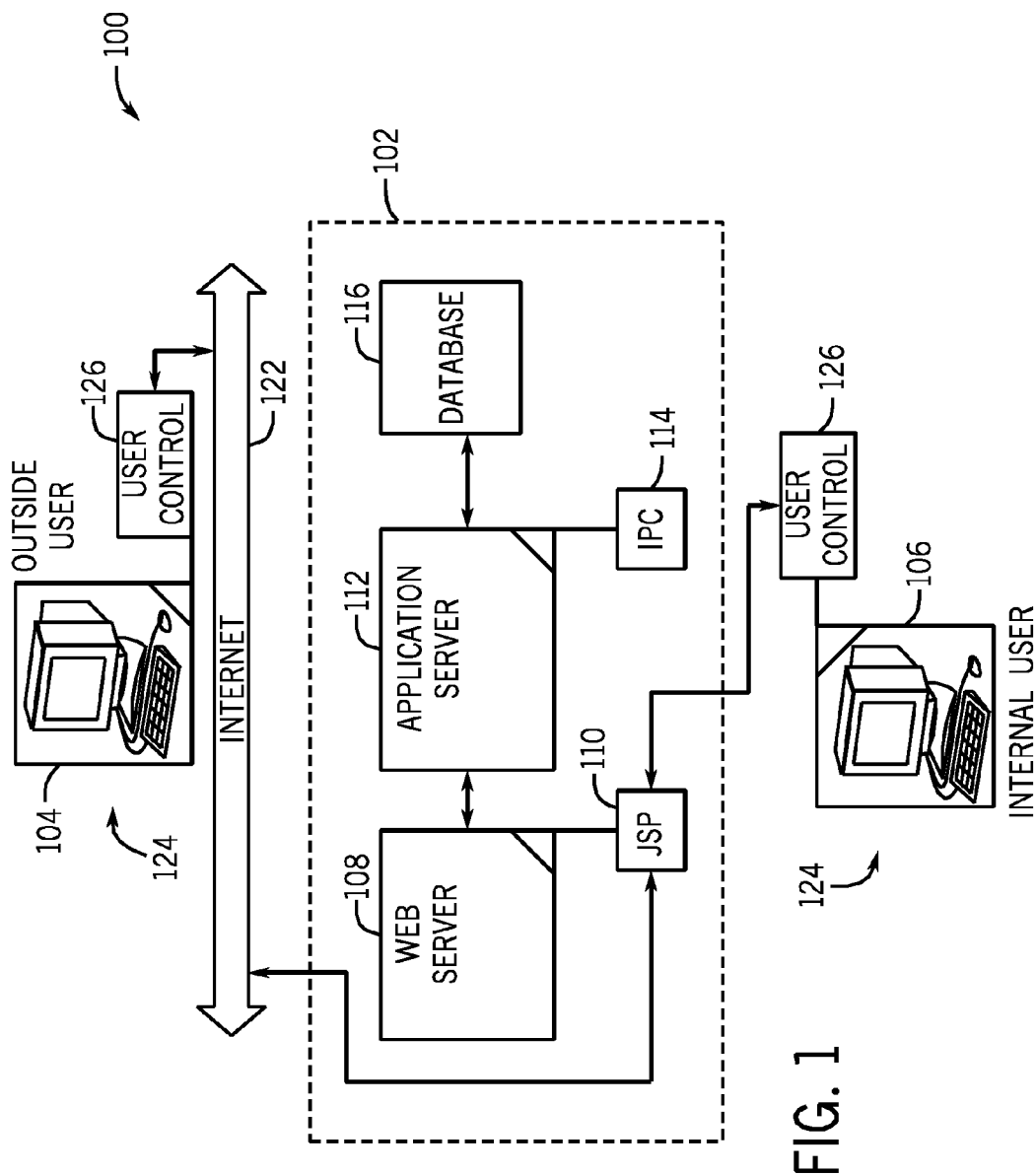

The present invention relates generally to the field of data communication. More particularly, the invention relates to a system and method for facilitating user-interaction with an Enterprise Resource Planning (ERP) system or a module of such a system without requiring a proprietary format associated with the ERP system.

An ERP system typically includes a centralized database and employs a common computing platform. An ERP system may be used to consolidate all of the operations of a business into an enterprise-wide system environment that is consistent or uniform throughout the enterprise. An ERP system may generally provide features for resource management. Indeed, an ERP system may be described as an integrated computer-based system that facilitates management of resources. The resources managed by an ERP system may include internal or external resources such as materials, tangible assets, financial resources, and human resources. A typical purpose for employing an ERP system is to facilitate information flow among internal and/or external entities. For example, businesses often utilize ERP systems to facilitate sharing and transmission of information between components of the business and outside entities.

An ERP system may be resident on a centralized server. However, an ERP system may also be distributed over various servers, which enables a business to customize and assemble different components without requiring inclusion of multiple copies of expensive systems in different areas. Indeed, an ERP system may be distributed across modules (e.g., hardware and software units) that provide various different services. Such modules may communicate via a local area network, an extended network, or the like. Communication with such modules may require that a proprietary format associated with the ERP system be utilized. However, it is now recognized that communication between applications external to an ERP system and certain modules of an ERP system may be desirable without requiring such a proprietary format.

BRIEF DESCRIPTION

Briefly, present embodiments are directed to facilitating integration of Enterprise Resource Planning (ERP) systems with external applications. Such integration is achieved in accordance with present techniques by creating and/or utilizing a user control in a software framework, which may be stored on a non-transitory computer readable medium and implemented by a processor of a device outside of the ERP system. In accordance with present techniques, the user control is used in the design of other applications external to the ERP system, and enables the external applications to interact with the aspects of the ERP system to perform product configuration. In one embodiment, the user control is configured to receive configurable material and an indication regarding whether a new configuration or a reconfiguration is being requested from an external application. The user control then converts the configurable material into a different format and submits the relevant information along with relevant address information to the ERP system. Specifically, the user control communicates with a server-side scripting component of the ERP system. The server-side scripting component communicates with a database and configurator of the ERP system via an Application Programming Interface (API). Based on the information from the user control and interaction with the database and configurator, the server-side scripting component provides a response object to the user control in a particular data representation or format. The user control converts the response object into a different data format and supplies it to the external application. In some embodiments, the information provided to the server-side scripting component via the user control may include an indication of whether or not a background determination is requested, and the server-side scripting component may respond with user interface information when a background determination is not requested.

DRAWINGS

Figure 2:
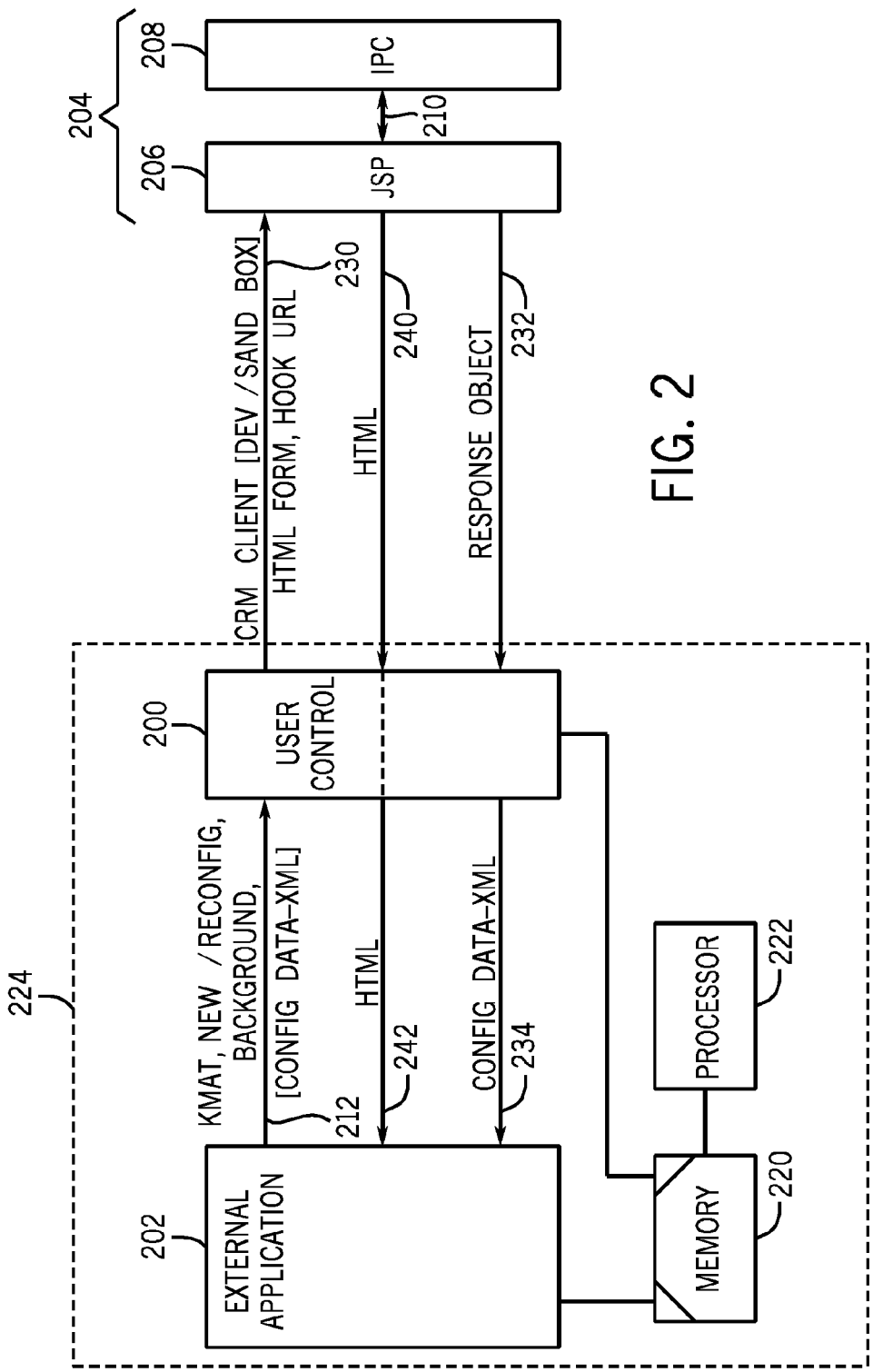

These and other features, aspects, and advantages of the present invention will become better understood when the following detailed description is read with reference to the accompanying drawings in which like characters represent like parts throughout the drawings, wherein:

FIG. 1 is a block diagram of a network including an ERP system in accordance with present techniques; and FIG. 2 is a block diagram of a user control configured to coordinate sharing of information between an external application and an ERP system in accordance with present techniques.

DETAILED DESCRIPTION

As discussed in detail below, embodiments of the present technique function to provide data communication and user interaction with an ERP system and/or a particular module of an ERP system in a non-proprietary format. In other words, present techniques facilitate communication between the ERP system and applications that are not associated with the ERP system, wherein the communication received and transmitted by the unassociated application proceeds via a format that is not proprietary with respect to the ERP system. In particular, one embodiment of the present technique is directed to facilitating interaction with an ERP system known as SAP (Systems Applications and Products in Data Processing), which is a product of SAP AG, a software corporation headquartered in Walldorf, Germany. SAP is typically divided into modules including Financial Accounting (FI), Controlling (CO), Production Planning (PP), Materials Management (MM), Sales and Distribution (SD), and so forth. One useful aspect or module of some SAP systems is the SAP Internet Pricing and Configurator (IPC), which enables users to configure products online and compare pricing information. Specifically, the SAP IPC, which may also be referred to as AP7, enables users to compare the prices of certain products across various catalogs and market places. The SAP IPC also typically includes a configurable product accrual function or shopping basket function.

Interaction between non-SAP applications and the SAP IPC traditionally requires development of a specialized user-interface for each non-SAP application, wherein the specialized user-interface employs a proprietary format associated with SAP. Such specialized user-interfaces are typically configured to coordinate with an Application Programming Interface (API) associated with the SAP IPC. Further, interaction between a non-SAP application and the SAP IPC generally requires modification or customization of SAP. It is now recognized that it is desirable to integrate the proprietary SAP IPC with non-SAP applications without using SAP's proprietary communication format with respect to the non-SAP applications. Further, it is now recognized that it is desirable to perform such a function without requiring customization of SAP.

As indicated above, present embodiments enable integration of the SAP IPC with non-SAP applications (e.g., computer programs and/or devices), which may be referred to as "external applications." Specifically, present embodiments facilitate integration of the User Interface and Engine of the SAP IPC with external applications. Such integration is achieved in accordance with present techniques by creating and/or utilizing a user control in a software framework, which may be stored on a non-transitory computer readable medium (e.g., a hard drive, a computer disk, ROM, flash drive) and implemented by a processor of a device (e.g., laptop, desktop, server, control system) outside of an ERP system (e.g., an SAP system). In one embodiment, the Microsoft.NET platform may be employed as the software framework for the user control. In accordance with present techniques, the user control is used in the design of other non-SAP applications (e.g., web pages), and enables the external applications to interact with the SAP IPC User Interface to perform product configuration. Specifically, the user control is configured to receive configurable material (e.g., KMAT) and an indication regarding whether a new configuration or a reconfiguration is being requested from an external application. The user control then submits an HTML (Hyper Text Markup Language) form including the relevant information along with relevant address information to the SAP system. Specifically, the user control communicates with a Java Server Pages (JSP) component, which is provide by the SAP system and communicates with the SAP IPC via an API. Based on the information from the user control and interaction with the SAP IPC, the JSP component provides a response object to the user control in a particular data representation (e.g., name-value pair). The user control converts the response object into XML-based configuration data that is supplied to the external application. In some embodiments, the information provided to the JSP component via the user control may include an indication of whether or not a background determination is requested, and the JSP component may respond with user interface information in HTML when a background determination is not requested.

References in the specification to "one embodiment," "an embodiment," or "an exemplary embodiment," indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Turning now to the drawings and referring to FIG. 1, a block diagram of a system 100 in accordance with present embodiments is illustrated. The system includes an ERP system 102 that is configured to communicate with external computers 104 and internal computers 106. A typical arrangement of the ERP system 102 may include a three-tiered architecture. For example, in the illustrated embodiment, the ERP system 102 includes a presentation tier, a logic tier, and a data tier. Each tier may include one or more servers and/or electronic data storage. In FIG. 1, the presentation tier is represented by a web server 108, which includes a server-side scripting language component. Specifically, in the illustrated embodiment, the server-side scripting language component 110 is a JSP component 110. The logic tier is represented by an application server 112, which includes a pricing data and configurator component. Specifically, in the illustrated embodiment, the pricing data and configurator component includes an IPC 114 such as that provided by SAP. The data tier includes a database 116. It should be noted that all of these components may be resident on a single physical server or distributed over various different physical servers. Further, it should be noted that the pricing data and configurator component or IPC 114 may include all or a portion of the database 116.

The web server 108 may provide a user interface for the internal computers 106 and the outside computers 104. The internal computers 106 may directly access the web server via a local area network or the like, while the outside computers 104 may access the web server via the Internet 122 or the like. Cumulatively, the outside computers 104 and the internal computers 106 may be referred to as user computers 124. The main function of the web server 108 may include translating tasks and results into data and graphical representations (e.g., text and figures) that a user is capable of readily understanding. To facilitate achieving this purpose, in the illustrated embodiment, the web server 108 includes the JSP component 110. The JSP component 110 communicates with the IPC 114 and user controls 126 in accordance with present embodiments. The user controls 126 reside on each of the user computers 124 and enable communication outside of a proprietary format of the ERP system 102. The JSP component 110 is a Java-based technology that utilizes server-side scripting language to provide dynamically generated web pages based on HTML, XML, or other document types. The JSP component 110 performs tasks on the server-side before providing generated web pages. Further, the JSP component 110 enables interleaving of certain code and actions with static web markup content. This results in a page being compiled and executed on the web server 108 to deliver a document.

The application server 112 performs various tasks and may include various different applications. Among other things, the application server 112 operates to coordinate applications, process commands, perform calculations, perform logical operations, make evaluations, and so forth. The application server 112 also transfers and processes data between the web server 108 and the database 116. For example, the application server 112 (or features of the application server) may access the database 116 based on information provided via the web server 108. Specifically, for example, data associated with a desired product may be submitted from one of the user computers 124 to the web server 108, which provides the data to the application server 112 and the IPC 114. In turn, the IPC 114 may provide pricing information based on a configuration function and information stored in the database 116. Depending on the demands of the application server 112, the database 116 stores and retrieves data from a file system or the like. Desired information is passed to the application server 112 for processing and may eventually return for storage in the database 116.

As indicated above, in the illustrated embodiment, the application server 112 includes the IPC 114, which may include a database component and a configurator. Pricing data and configurator components, such as the IPC 114, are typically used in various different ERP system applications to configure products. Indeed, numerous SAP applications may utilize the IPC 114. The IPC 114 is generally associated with a Customer Relationship Management (CRM) component of SAP. Thus, the IPC 114 may be described as an SAP CRM concept that is used to get price information about a sales order, quote, or contract being created by a customer. The stored price information and so forth may be considered the database portion of the IPC 114. The configurator part of the IPC 114 may be considered to be an active component that assists customers in deciding on the designation of various characteristics of products. For example, the IPC 114 may be utilized when a customer is configuring a car for purchase over the Internet. When designating the desired car, the user may provide values for certain characteristics (e.g., a color, a model, and an indication of "new" or "used") to the IPC 114. The IPC 114 may take this information and provide a response indicative of price, availability, and so forth. For example, the IPC 114 may indicate that because the customer selected a specific color, only certain model types are available. As another example, the IPC 114 may indicate that a truck is available in the designated color for a specific price.

In the system 100 of FIG. 1, it should be noted that the user computers 124 are considered to be external to the ERP system 102. In other words, the user computers 124 are not integrated with the ERP system 102 and do not utilize the proprietary format of the ERP system 102. Traditionally, the IPC 114 limits accessibility to when the proprietary format of the ERP system 102 is employed. However, in accordance with present embodiments, the user computers 124 include the user controls 126 stored in a memory of each user computer 124 to enable communication in a non-proprietary format with respect to the user computers 124. As will be discussed in further detail below, the user controls 126 communicate with the JSP component 110. In conjunction with other aspects of present techniques, this enables communication between the user computers 124 and the IPC 114 in a non-proprietary format. Present embodiments facilitate deployment of a common product configurator platform across multiple configurator applications that are external to the ERP system 102, and this will reduce the development cycle for certain products and reduce the time to market for certain new product development for businesses utilizing certain ERP systems, such as the ERP system 102.

FIG. 2 is a block diagram of a user control 200 coordinating the sharing of information between an external application 202 and an ERP system 204. The user control 200 is illustrated as a software feature and may include various modules (e.g., assembled code or instructions) for performing various functions in accordance with present embodiments. For example, as discussed below, the user control 200 may operate to transmit and receive data, translate data, and provide a user interface. It should be understood that such actions may be performed by modules that are configured for such tasks. The external application 202 may include a software application or device that is separate from the ERP system 204. The ERP system 204 may include features such as those of the ERP system 102 in FIG. 1. Further, the ERP system 204 may include SAP.

Specifically, in FIG. 2, the user control 200 is illustrated as providing a conduit and translation of information passing between the external application 202 and a JSP component 206 of the ERP system 204. In turn, the JSP component 206 is receiving and transmitting data to an IPC component 208 of the ERP system 204 via an Application Programming Interface (API) 210, which is a software implemented interface that enables interaction between the JSP component 206 and the IPC component 208. Specifically, the API 210 is implemented by the JSP component 206 and the IPC component 208 to determine respective vocabularies and calling conventions of each, which the API 210 uses to access features of the IPC component 208. These features of the IPC component 208 may thus be utilized by the user control 200 via the JSP component 206. The API 210 generally requires interactions that utilize a proprietary format of the ERP system 204.

Traditionally, external programs and devices such as the external application 202 have accessed the IPC component 208 directly through the API 210. However, this required utilization of the proprietary format associated with the ERP system 204, and creation of a custom user interface. In contrast, in accordance with present embodiments, implementation of the user control 200 on the external application 202 enables communication without using the proprietary format and allows use of the same user interface available in SAP IPC. Among other things, this is achieved by enabling the user control 200 to communicate with the external application 202 and the JSP component 206. The user control 200 communicates with the external application 202 using a widely recognized encoding format. For example, in one embodiment, the user control 200 utilizes XML, which is a set of rules for encoding documents in a form that is machine-readable. It may be beneficial to utilize XML between the user control 200 and the external application 202 because XML is widely used and will likely be available for numerous applications. The user control 200 may translate XML-based data received from the external application 202 into a format that the JSP component 206 is capable of receiving and/or utilizing. Specifically, in one embodiment, the user control 200 translates XML data into an HTML form for submission to the JSP component 206, which is capable of handling data presented as an HTML form. Further, the user control 200 may receive and interpret a response from the JSP component 206 provided in a particular data representation format and provide the external application 202 with the response in the encoding format recognized by the external application 202. Specifically, for example, the JSP component 206 may provide a response as a name-value pair or attribute-value pair representation and the user control 200 may translate the response into XML data and transmit the translated response to the external application 202.

In the illustrated embodiment, the user control 200 and the external application 202 are stored on a memory 220 and operated by a processor 222 of a computer 224 (e.g., a laptop or desktop computer). In operation, the user control 200 acquires or receives data from the external application 202. In other words, data is transmitted from the external application 202 to the user control 200. Various data transmissions are illustrated in FIG. 2 as arrows. The transmission of data from the external application 202 to the user control 200 is represented by arrow 212. Specifically, the external application 202 provides material to the user control 200 as configuration data in a standard encoding format such as XML. In one embodiment, the material includes configurable material or KMAT, which may be beneficial over other material types because a large number of combinations of features may be selected for a product. The configurable material includes characteristics, values, and rules. For example, a characteristic may include "color," a value may include "red," and a rule may include "only model-A is available when red is the value of color." Configurable material such as this may be utilized in conjunction with the IPC component 208 to define aspects of a particular product and generate information about availability, price, and so forth. It should be noted that the user control 200 may provide a user interface that enables customization of the configurable material. Indeed, in one embodiment, the user control 200 is capable of receiving specific user selections of characteristics, values, and rules via a user interface provided by the user control 200.

In addition to the configurable material, the data transmission 212 also includes certain discrete variable indications regarding functions to be performed by the user control 200. For example, the data transmission 212 includes an indication as to whether a new configuration is being requested or a reconfiguration of an existing configuration is being requested. This indication may be provided by selecting a "start configuration" button or a "reconfigure" button in a user interface provided in accordance with present embodiments. If a user indicates that a new configuration is desired (e.g., selects the "start configuration" button), a new configuration is initiated. If the user indicates that a reconfiguration is desired (e.g., selects the "reconfigure" button), an indicated existing configuration is provided for editing. Further, in one embodiment, the data transmission 212 includes an indication of whether a background determination is desired. This may also be indicated by selecting a button or the like. This indication relates to whether a user interface (e.g., a graphical data entry feature) is provided for particular changes or selections, as will be discussed in further detail below.

The user control 200 converts the information from the data transmission 212 into information that the JSP component 206 is capable of handling (e.g., an HTML form). Accordingly, the characteristics, values, and rules provided by the data transmission 212 are converted into an HTML form that is then transmitted from the user control 200 to the JSP component 206. The data transmission including this converted or translated information is represented by arrow 230 in FIG. 2. Specifically, in the illustrated embodiment, the configuration material and so forth from the data transmission 212 is converted into an HTML form and provided to the JSP component 206 based on a specified address of the JSP component 206. Indeed, the data transmission 230 also includes instructions regarding delivery of the data provided therein. Specifically, the data transmission 230 may indicate that data should be provided to a particular landscape of a particular client at a specific address. For example, the data transmission 230 may be directed to a CRM client and a development/sandbox server of the ERP system 204. Further, the data transmission includes an address of the user control component 200 (e.g., hookURL).

As discussed above, the JSP component 206 is configured to cooperate with the IPC component 208 via the API 210. Specifically, in the illustrated embodiment, the JSP component 206 utilizes the information provided via the data transmission 230 to activate the IPC component 208 via the API 210 and to acquire a response from the IPC component 208 that is based on the characteristics, values, and rules set forth in the HTML form of the data transmission 230. Once the results from the IPC component 208 based on the information in the HTML form are obtained, the JSP component 206 makes them available as a response object, as represented by data transmission 232. Specifically, the user control 200 accesses this response object and translates it from a data representation provided by the JSP component 206 into a data format that is utilized by the external application 202. For example, the user control 200 may receive the response object as a name-value pair in the data transmission 232 and convert the response object into XML. After translation, the data from the response object is provided to the external application, as represented by data transmission 234.

As discussed above, in some embodiments, the information provided to the JSP component 206 via the user control 200 may include an indication of whether or not a background determination is requested, as represented by the data transmission 212. The indication may be selected in a separate user interface as a check box or the like. If the box is checked by the user a background determination will be performed without potentially time consuming and inefficient utilization of a user interface. For example, if a user wants to configure multiple features with a single value of a characteristic, the user may prefer to do so in a background determination so that initiation of a user interface for each feature is not required. As a specific example, a user may be configuring a cabinet for a motor control center. One characteristic of each component of the cabinet may be a "name display" that has a value of either "yes" or "no." In other words, a user can select to either provide a component with a "name display" or not. If a user wishes to exclude the "name display" on every component, the user may select a value of "no" for the "name display" characteristic for all components and utilize a background determination, which may avoid utilization of a user interface for each component that is being modified.

When a background determination is not requested, the JSP component 206 provides HTML data, as represented by transmission 240. The HTML data corresponds to the provision of a user interface for a particular configuration or the like. In other words, the HTML data enables the display and utilization of a user interface for configuration purposes. The HTML data is received by the user control 200 and is then simply passed along unchanged to the external application 202, as represented by data transmission 242. It should be noted that the capability of designating a background determination may require modification of at least one component of the ERP system 204.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A user control in a software framework and stored on a non-transitory computer readable medium, comprising:
    a module configured to receive configurable material in a first data format from an external application and configured to convert the configurable material into a second data format;
    a module configured to make the configurable material available in the second data format to a server-side scripting component of an Enterprise Resource Planning (ERP) system;
    a module configured to receive a response object from the server-side scripting component in a third data format and convert the response object into configuration data in the first data format; and
    a module configured to transmit the configuration data in the first data format to the external application.

2. The user control of claim 1, wherein the software framework comprises Microsoft.NET.

3. The user control of claim 1, comprising a module configured to receive an indication of whether a new configuration or a reconfiguration is desired and configured to activate the new configuration or the reconfiguration based on the indication.

4. The user control of claim 1, comprising a module configured to provide a user interface to facilitate provision of the configurable material and display of the configuration data to a user.

5. The user control of claim 1, wherein the response object comprises an indication of validity or invalidity of the configurable material.

6. The user control of claim 1, wherein the ERP system comprises an SAP system.

7. The user control of claim 1, wherein the server-side scripting component comprises a Java Server Pages (JSP)

component configured to cooperate with an SAP Internet Pricing and Configurator (IPC).

8. The user control of claim 1, comprising a module configured to receive an indication of whether a background configuration is desired and to prevent the provision of data corresponding to a user interface from being provided by the server-side scripting component when the background configuration is indicated.

9. The user control of claim 1, wherein the first data format comprises XML.

10. The user control of claim 1, wherein the second data format comprises an HTML form.

11. The user control of claim 1, wherein the third data format comprises name-value pair.

12. A method of facilitating communication between an external application stored on an external computer and an Enterprise Resource Planning (ERP) system component without utilizing a format of the ERP system, comprising:
receiving configurable material in a first data format from the external application into a user control stored on the external computer and converting the configurable material into a second data format with the user control;
making the configurable material available in the second data format to a server-side scripting component of an Enterprise Resource Planning (ERP) system;
receiving a response object from the server-side scripting component in a third data format and converting the response object into configuration data in the first data format with the user control; and
transmitting the configuration data in the first data format to the external application with the user control.

13. The method of claim 12, comprising providing the user control in a Microsoft.NET software framework.

14. The method of claim 12, comprising receiving an indication of whether a new configuration or a reconfiguration is desired and activating the new configuration or the reconfiguration based on the indication with the user control.

15. The method of claim 12, comprising providing a user interface with the user control to facilitate provision of the configurable material and display of the configuration data to a user.

16. The method of claim 12, wherein making the configurable material available to the server-side scripting component comprises transmitting the configurable material to a Java Server Pages (JSP) component that is configured to cooperate with an SAP Internet Pricing and Configurator (IPC).

17. The method of claim 12, comprising receiving an indication of whether a background configuration is desired and preventing the provision of data corresponding to a user interface from being provided by the server-side scripting component when the background configuration is indicated.

18. The method of claim 12, wherein the first data format comprises XML, the second data format comprises an HTML form, and the third data format comprises name-value pair.

19. A system, comprising:
an Enterprise Resource Planning (ERP) system, comprising:
one or more servers;
a server-side scripting component stored on the one or more servers; and
a pricing data and configurator component stored on the one or more servers, wherein the server-side scripting component and the pricing data and configurator component interact via an Application Programming Interface (API); and
a computer in communication with the ERP system, comprising:
a processor;
a memory;
an external application stored on the memory; and
a user control stored on the memory, wherein the user control comprises software modules configured to perform the following steps when executed by the processor:
receive configurable material in a first data format from the external application and convert the configurable material into a second data format;
make the configurable material available in the second data format to the server-side scripting component;
receive a response object from the server-side scripting component in a third data format and convert the response object into configuration data in the first data format; and
transmit the configuration data in the first data format to the external application.

20. The system of claim 19, wherein the server-side scripting component comprises a Java Server Pages (JSP) component and the pricing data and configurator component comprises an SAP Internet Pricing and Configurator (IPC).

21. The system of claim 19, wherein the user control comprises a module configured to receive an indication of whether a background configuration is desired and prevent provision of data corresponding to a user interface from being provided by the server-side scripting component when the background configuration is indicated.

* * * * *